Jan. 28, 1941.　　　H. M. STEPHENS　　　2,229,777
MINING CUTTER
Filed April 20, 1938
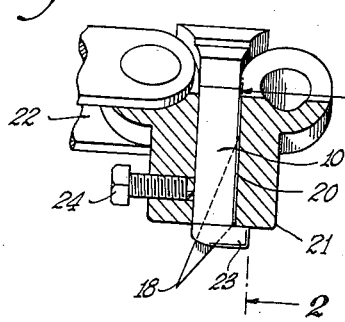
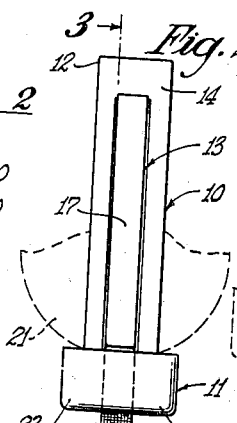
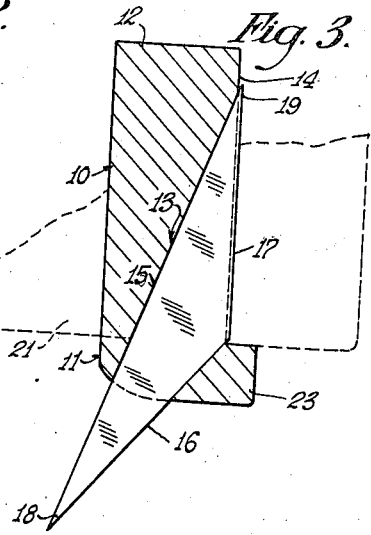
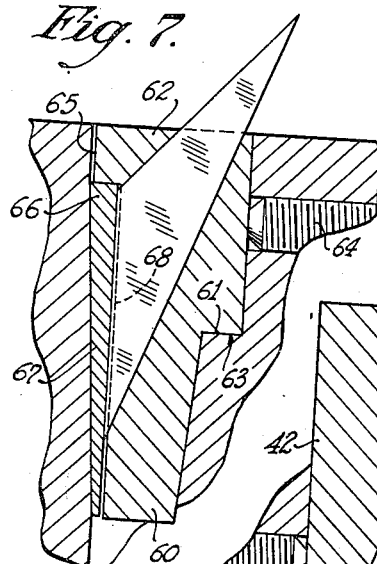
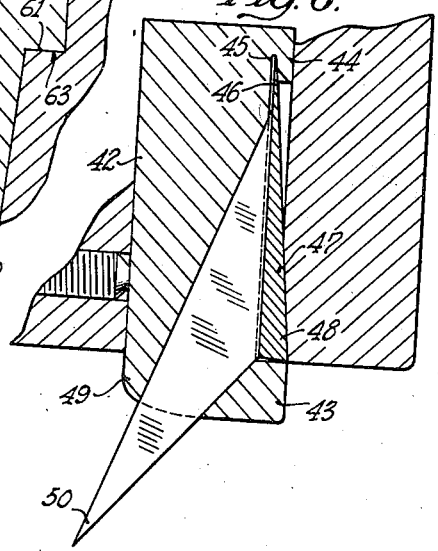
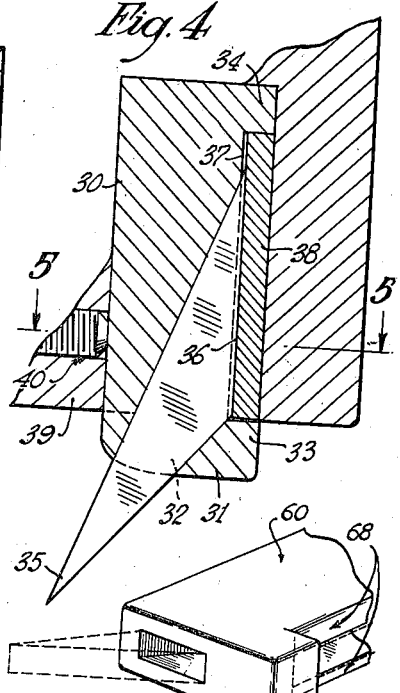
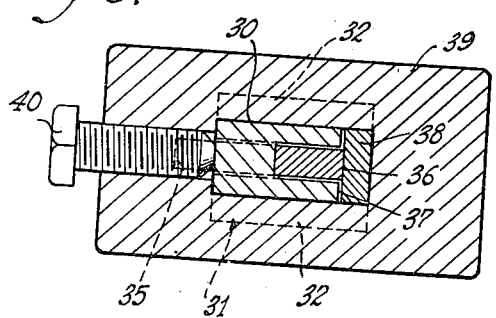
Henry M. Stephens
INVENTOR.
BY Clarence E. Threedy
HIS ATTORNEY.

Patented Jan. 28, 1941

2,229,777

UNITED STATES PATENT OFFICE 2,229,777

MINING CUTTER

Henry M. Stephens, Oakland, W. Va.

Application April 20, 1938, Serial No. 203,017

19 Claims. (Cl. 262—33)

This invention relates to mining tools and more particularly to a chain type cutter, a particular object being the provision of an improved device of this class including a chuck adapted to fit into the cutter socket in a link of a mining chain, and a bit seated in the chuck in such manner as to dispose a portion of the bit in the link socket along with the chuck whereby to procure a simpler and, at the same time, more rugged and less expensive cutter.

Another object is the provision of a cutter including a chuck having a shank portion with a tapered opening cut through a side of the shank and extending through an end thereof, with an angularly shaped bit receivable in the opening with one portion protruding through the endwise opening in the shank and an adjoining portion disposed substantially flush with said side of the shank, the shank and the flush portion of the bit fitting into the chain socket to be secured in the latter.

Another object is the provision of a device of the class described in which the shank is particularly formed to fit flush into the chain socket with only the cutting end of the bit exposed, the shank having formations cooperable with complementary formations in the chain socket for properly seating the chuck in the latter, and there being additionally provided a wear plate or keeper interposed between the exposed portion of the bit along the side of the shank and the chain socket for the purpose not only of preventing injury to the chain socket, but also more securely locking the bit in place.

Yet another object is the provision of a cutting tool of the class described, and in which there is provided a wedge-shaped keeper or wear plate shaped in a particular manner for the purpose of properly aligning the chuck in the cutter socket and also to take up the load in the region of its greatest concentration in the cutter socket.

Other objects and novel aspects of the invention reside in certain details of construction and arrangement of parts hereinafter to be described particularly in view of the drawing, in which:

Fig. 1 is a sectional view of a socket link in a mining chain with a cutting tool in place;

Fig. 2 is a rear elevational view of the form of the cutter shown in Fig. 1, as viewed in the direction of line 2—2 thereof;

Fig. 3 is a sectional side view of the cutter of Fig. 2, looking in the direction of line 3—3 thereof;

Fig. 4 is a side section of a modified form of chuck which includes a keeper;

Fig. 5 is a horizontal section through the cutter of Fig. 4, looking down along line 5—5;

Fig. 6 is a vertical side section through a modified form of chuck and keeper plate;

Fig. 7 is a vertical side section through another form of chuck including seating formations and a wedge-shaped keeper plate, while Fig. 8 is a fragmentary perspective of the socket end of the chuck shown in Fig. 7.

The present invention includes certain improvements over a form of cutter shown in my copending United States application, Serial No. 172,942, now Patent No. 2,148,309, granted February 21, 1939, and over the type of cutter shown in my United States Patent 2,090,012.

In a preferred embodiment of the present invention, referring to Figs. 2 and 3, there is provided a carrying means or chuck for a triangularly shaped cutting bit, the chuck including a relatively elongated shank portion 10, one end 11 of which constitutes the head or top of the chuck, while the opposite end 12 constitutes the foot thereof. The chuck shank 10 is preferably, though not necessarily, of rectangular cross section, and there is formed in the chuck a tapered bit-receiving or seating opening 13 which extends from one side 14 of the shank diagonally toward and through the head 11 thereof, the larger end of the tapered opening being disposed in the side 14 with the smaller end in the head 11, and the larger opening extending substantially the length of the shank.

The cutting tool or bit is preferably in the shape of a triangular piece of tool steel suitably tempered for mining purposes, the triangle being preferably of isosceles form so as to have a base 15 (Fig. 3) flanked by adjoining equilateral sides 16 and 17, the junctures between the sides and the base constituting cutting points 18 and 19.

The bit-receiving opening 13 is pitched or tapered in such manner that the cutting bit will fit therein with one of its points, for example the point 18, projecting through the smaller opening in the head 11, the base 15 fitting substantially flush against the diagonal floor of the opening, and the side 17 fitting substantially flush against the side 14 of the shank when the bit is assembled with the chuck.

The bit and chuck are fitted into the socket 20 in a link 21 forming part of a cutting chain 22 (Fig. 1), the head portion 11 of the chuck having a laterally extending boss or shoulder formation 23 which fits flush against the top of the link 21 to limit the depth to which the chuck will drop in the chain socket, so that the cutting point 18 will be properly aligned in operative position.

A set screw 24 is provided in the link 21 and may be drawn up against the side of the shank opposite the side 14 thereof so as to wedge the shank and the slightly exposed edge portion 17 of the bit against the wall of the socket. It will thus be apparent that the cutting tool itself comprises only two parts, the chuck and bit, so arranged as to interfit for positioning in the chain socket in such manner that both the shank of the chuck and the bit itself are wedged against the link socket by the screw or other retaining means customarily provided in mining chains of this class.

The advantage of this arrangement in simplicity is self-evident, and the mechanical advantage resulting from the particular arrangement of the bit and shank in the socket provides a much more secure mounting for the cutting tools or bits, and permits of quick changes without special tools, thus resulting in a saving of time for the miners, who are obliged to work in relative darkness and who must change great numbers of bits throughout the shift.

In the modified form of Fig. 4, there is provided a chuck having a shank 30 with a head portion 31 provided with laterally extending shoulder formations on its wider opposite sides, indicated in dotted lines at 32 in Fig. 5, one of the lateral end portions of the head providing a boss or abutment formation 33 opposite a similar boss 34 at the foot of the shank, the bosses 33 and 34 flanking the opposite sides of the large end of the opening of the bit socket, a triangular bit similar to that shown in Fig. 3 being inserted in the socket opening with its point 35 projecting beyond the head, as in the case of the device of Fig. 3, and having one of its equilateral sides 36 substantially flush with the sides of the shank 37 between the bosses 33 and 34.

An elongated keeper plate 38 is fitted into the side opening between the bosses 33 and 34 flush against the edge 36 of the bit, so that the longitudinal side of the chuck opposite the edge 36 is trimmed substantially flush by the keeper 38, and the chuck assembly is dropped into the socket of the cutter link 39 and the set screw 40 of which may be turned up against the side of the shank opposite the plate 38 to force the latter against the wall of the socket and thus securely clamp the tool in position, the flanges or shoulders 32 properly seating the chuck in the socket, as in the case of the shoulder formations 23 of the device of Figs. 2 and 3. In the arrangement of Fig. 4, the keeper plate 38 constitutes a buffer against which the exposed edge portion 36 of the bit may wear during the cutting operations, the provision of the bosses 33 and 34 providing additional securing means for the bit so that the latter may be subjected to extremely hard usage.

In Fig. 6, there is shown a modification of the arrangement of Fig. 4 wherein a chuck 42 is provided with the same diagonally tapered bit seat with bosses 43 and 44 on opposite sides of the wider opening of the bit seat, as in the case of the device of Fig. 4. However, the boss 44 is slotted as at 45 in a longitudinal direction to receive the tapered end portion 46 of a wedge-shaped keeper 47, the wider end 48 of which is disposed nearest the head 49 and point 50 of the tool and the mouth of the cutter socket. It is in this latter region that the greatest thrust is exerted by the bit against the opposite wall portions of the cutter socket. The wedge-shaped form of the keeper 47, therefore, not only secures the bit additionally in place, but it prevents wear against the link socket in the region of greatest thrust of the bit and also tends to align the shank in the link socket irrespective of the shoulder or boss formations 43 (shoulder formations similar to the shoulders 32 in the device of Figs. 4 and 5 being optionally provided). In other respects, the device of Fig. 6 is similar to the embodiments heretofore described.

It is sometimes desirable that the chuck be seated flush with the cutting chain and in such cases the form of cutter shown in Fig. 7 is preferable, there being a chuck having a shank portion 60 provided with a shoulder or offset ledge 61 between its foot and head 62, the shoulder 61 being adapted to rest against a ledge 63 formed in the link socket in the region below the set screw 64. The lower or foot portion of the shank is tapered opposite the particular side thereof in which the wider mouth of the bit opening is disposed, the socket being correspondingly tapered and the wall portion thereof opposite the particular exposed edge of the bit being preferably tapered throughout its length to conform to the pitch of the keeper.

The head 62 of the chuck is extended laterally to provide a boss 65 (see also Fig. 8) which constitutes an abutment for the wider upper end 66 of a wedge-shaped keeper 67 which is adapted to fit flush against the edge or side 68 of the bit which extends collaterally with the shank, as in the arrangement of Figs. 4 and 6.

When the bit and chuck are seated in the link socket as shown in Fig. 7, the shoulder formation 61 of the chuck rests on the ledge 63 in the link socket, thus seating the chuck in proper position relative to the link, with the head portion 62 of the chuck flush with the top of the link. The wedge-shaped keeper 67, by virtue of its shape, likewise constitutes a means for aligning the chuck properly in the link socket cooperably with the formation 61—63, the wider upper end portion 66 of the keeper taking up the major portion of the working thrust in the manner of the device of Fig. 6, the set screw 64 being drawn up to secure the tool against removal.

The improved cutting tool may be used in other forms of cutting chain than the one specifically illustrated, and various modifications may be made in certain of the specifically described details of the preferred embodiments of the invention set forth at length herein without departing from the spirit of the invention, which therefore is not to be limited to any of the details heretofore recited, except as may be particularly provided in the appended claims.

Having thus described my invention, what I claim as new and desire to protect by Letters Patent is:

1. A cutting tool including a substantially elongated shank having a head portion at one end with an opening tapered from one longitudinal side of the shank diagonally therethrough and issuing at its smaller end in said head, said shank having boss formations near its opposite ends flanking the larger opening in said longitudinal side, a triangularly shaped bit fitted into said opening with one of its particular sides substantially flush with said longitudinal side between said bosses and having a cutting point extended through said smaller opening in the head, and a keeper corresponding substantially in width to the width of said shank and fitted between said bosses against said particular side of the bit, said shank being inserted in the socket of a carrier with said keeper adapted to prevent said particular side of the bit from bearing against the wall of the socket.

2. In a device of the class described, a chuck in the form of a substantially elongated shank member of substantially rectangular cross section and having a bit opening extending from one of its longitudinal sides diagonally therethrough and terminating in an end thereof, said opening being tapered so as to have its larger mouth disposed in said longitudinal side with its smaller mouth disposed in said end, a triangular bit formed to fit into said opening with a portion extending through the latter and constituting a cutting point, said bit having a particular edge portion opposite said point disposed to lie substantially flush with said longitudinal side of the shank, said shank having a shoulder running around three sides near said end through which the cutting point extends, said shank having a boss disposed at the opposite end thereof and opposite to an intermediate portion of said shoulder formation so as to flank the larger mouth of said opening cooperable with said intermediate shoulder portion, a keeper fitted between said boss and said intermediate shoulder against said particular edge of the bit and dimensioned to be flush with the sides of said shank to lie in the plane of the same and fit into the receiving socket of a tool carrier.

3. A cutting tool including a chuck having a shank portion with a shoulder formation at an end thereof constituting the head of the shank, a tapered bit-receiving opening extended diagonally through said shank from a particular longitudinal side thereof through said head, a tapered bit seated in said opening and having a portion projecting through said head, said bit having a particular edge portion lying substantially flush with said particular edge of the shank in alignment with said boss, said shank having a second boss at its end opposite said first-mentioned boss, and a wedge-shaped keeper fitted against said particular edge of the bit between said bosses with its larger end disposed adjacent said first-mentioned boss, said chuck and keeper being fitted into the socket of a carrier, said keeper being adapted to prevent said bit from wearing into said socket.

4. A cutting tool including a chuck having a shank portion with a shoulder formation providing a boss at an end thereof constituting the head of the shank, a tapered bit-receiving opening extended diagonally through said shank from a particular longitudinal side thereof through said head, a tapered bit seated in said opening and having a portion projecting through said head, said bit having a particular edge portion lying substantially flush with said particular edge of the shank in alignment with said boss, said shank having a second boss at its end opposite said first-mentioned boss, said second boss being slotted, and a wedge-shaped keeper fitted against said particular edge of the bit between said bosses with its larger end disposed adjacent said first-mentioned boss, said keeper having its narrower end disposed in said slot in the second boss, said chuck and keeper being fitted into the socket of a carrier, said keeper being adapted to prevent said bit from wearing into said socket and serving to prevent separation of the bit from the chuck so long as the latter is in said socket, said first-mentioned boss fitting against said carrier to limit the movement of said chuck into said socket.

5. The combination of a link for use in a mining chain and having a tapered socket with a ledge formation between its bottom and mouth, and a cutter having a chuck with a tapered shank dimensioned to fit into said socket with its head portion substantially flush with the mouth of said socket, said shank having an offset shoulder between its ends arranged to rest against said ledge formation, said shank having a tapered opening with its wider mouth disposed in a particular side of the shank extending collaterally with an opposite wall portion of said socket, said opening extending diagonally through the shank and issuing at its smaller end in the head thereof flush with said mouth of the link, a triangular bit fitted into said opening with a portion projecting through said smaller end thereof, said bit having a particular edge portion extending collaterally and substantially flush with said particular side of the shank, the head of said shank including a lateral boss projecting beyond said particular side thereof within said socket, and a wedge-shaped keeper disposed opposite said particular side of the shank between said particular edge of the bit and the opposite wall of the socket beneath said boss and serving to seat said chuck properly in said socket and prevent said bit from thrusting against the socket.

6. A mining tool including a link constructed to be mounted in a mining chain, said link having an elongated socket with a mouth portion flush with a side of the link and tapering inwardly toward its foot portion, a substantially elongated shank with its opposite ends constituting respectively head and foot portions, said head portion including a laterally extending boss, a tapered opening cut diagonally through said shank with its wider mouth disposed in a longitudinal side of the shank, said opening having its smaller end in said head, a triangular bit fitted into said opening and having a portion projecting through the smaller end thereof with an opposite side portion extending substantially flush with said particular longitudinal side of the shank at one side of said boss, a wedge-shaped keeper disposed against said longitudinal edge of the shank with its wider portion closely adjacent said boss and having a relatively flat face confronting said shank and bit with a slanted opposite face fitting against the tapered wall portion of said socket whereby to register said shank in said socket with the head portion thereof substantially flush with the top of said link, and means in said link for urging said shank in a direction to press said keeper against the confronting wall portion of the socket.

7. In a mining chain, a link having a cutter socket with a side wall tapering from the mouth thereof inwardly of the link, an opposite wall portion of said socket having a ledge formation intermediate the ends of the socket with an adjoining part of said last-mentioned wall portion between said ledge formation and the inner extremity of the socket being slanted, a cutter having a shank with a ledge formation in a side thereof and a tapered portion extending from said ledge formation to fit against said ledge formation and adjoining slanted wall portion of the socket, and a keeper constructed to fit against a side of said cutter opposite the ledge formation therein and having a slanted surface fitting close against said slanted wall portion of the socket opposite said ledge formation therein.

8. A cutting tool for use with a mining chain of the type including a cutter socket, said tool including a chuck adapted to fit into said socket, said chuck having a head portion disposed outwardly of the mouth of said socket, a bit receiving opening extending through said chuck in a direction through said head from a side portion adjoining the head, said opening tapering toward the head, a tapered bit adapted to fit into said opening with a cutting portion projecting beyond the head, and having a portion exposed at the wider mouth of said tapered opening in said adjoining side of the chuck, and a keeper fitted against said exposed portion of the bit and fitted with the chuck into said socket to maintain the bit in cutting position.

9. The device of claim 8 further characterized in that said chuck is provided with oppositely positioned boss formations between which said keeper is fitted to prevent displacement of the keeper in directions inwardly and outwardly of the socket.

10. The device of claim 8 further characterized in that said chuck has a cut-away portion in its side adjacent said exposed portion of the bit and into which said keeper is fitted approximately flush with the chuck for the purpose aforesaid.

11. The device of claim 8 further characterized in that said keeper is tapered inwardly of the socket and said chuck is provided with a stopping shoulder against which the end of said keeper nearest the mouth of the socket abuts to prevent displacement outwardly of the socket.

12. A cutting tool for use with a mining chain of the type including a socket, said tool comprising an elongated chuck adapted to fit into said socket, said chuck having a bit receiving opening extending from a longitudinal side portion thereof outwardly through an outer end thereof adjacent the mouth of the socket, said opening tapering toward said outer end, a tapered bit adapted to fit into said opening and having a cutting point projecting through said outer end, a keeper fitting against the side of said chuck opposite the wider or entrance portion of said tapered opening, means providing a stopping shoulder adjacent said head opposite the outer end of said keeper, said chuck having a slot portion into which the opposite and inner end of the keeper is fitted, whereby to prevent displacement of the keeper relative to the chuck and socket when the parts are in assembled relation.

13. The device of claim 12 in which said keeper is tapered inwardly of the socket and thereby acts to wedge said keeper against said bit during cutting action.

14. A cutting tool adapted for use with a mining chain of the type having a tool socket, said tool including an elongated chuck having a shank portion which fits into said socket and a head portion adjacent the mouth of the socket, said chuck having a bit receiving opening extending from a side of the shank through said head and tapering toward the latter, a tapered bit receivable in said opening and having a side portion exposed for engagement with a keeper in the region of the wider entrance portion of the opening in said shank, an abutment portion on said head opposite the outer end of said keeper and limiting movement of the latter outwardly of the socket in assembled relation, said chuck having a slot in said shank adjacent the end of the chuck which is opposite said abutment portion, an inner end portion of the keeper fitting into said slot.

15. The device of claim 14 further characterized in that said keeper is tapered in a direction inwardly of the socket to wedge against said bit responsive to movements of the chuck and keeper in a direction generally inward of the socket.

16. A mining tool for use with a mining chain including a tool socket, said tool including an elongated chuck adapted to fit into said socket, coacting surface portions on the chuck and socket for limiting movement of the chuck inwardly of the socket, said chuck having a bit receiving opening extending from a longitudinal side portion thereof generally outward of the socket through an outer end portion of the chuck adjacent the mouth of the socket, said opening tapering toward said outer end portion of the chuck, a tapered bit receivable in said opening and having a surface portion exposed at the longitudinal side of the chuck, a keeper fitted against the side of the chuck to prevent displacement of the bit outwardly of said opening, said chuck and keeper being fitted together in said socket.

17. The device of claim 16 in which said chuck is provided with an abutment shoulder adjacent said outer end portion and against which the outer end of the keeper bears in assembled relation to prevent displacement of the keeper outwardly of the socket.

18. A cutting tool for use with a mining chain or the like having a tool receiving socket, said tool comprising an elongated chuck adapted to fit into said socket, said chuck and socket having complementary portions tapered inwardly of the socket, said chuck having a bit receiving opening extending from a longitudinal side thereof through an outer end portion thereof adjacent the mouth of the socket, said opening tapering toward said outer portion, a tapered bit adapted to fit into said opening with a portion projecting beyond the chuck, and a portion exposed at the side of the chuck, and a wedge-shaped keeper fitted against the exposed portion of the bit along the side of the chuck and coacting with the latter to wedge the bit into said opening responsive to thrusts directed generally inward of the socket.

19. A mining cutter for use with a mining tool having a socket adapted to receive a cutter element, said cutter comprising a chuck having a shank fitting into said socket, said chuck having a head portion and being provided with a bit-receiving opening extending from a side of the shank constituting the mouth of the opening, through said head and tapering from said mouth toward the head, a tapered cutter bit fitting into said opening through the mouth thereof and having a cutting portion projecting from the opening in the head beyond the latter, said bit having a side portion remote from said cutting portion and disposed approximately flush with said mouth of the opening in the chuck, said head having a shoulder portion projecting beyond the mouth and the plane of said side portion of the bit at the mouth, together with an elongated keeper fitting beneath said shoulder along the side of the shank against said mouth between the latter and the side of said socket, and means for securing said cutter in said socket.

HENRY M. STEPHENS.